(12) United States Patent
Kilgard

(10) Patent No.: US 8,044,956 B1
(45) Date of Patent: Oct. 25, 2011

(54) COVERAGE ADAPTIVE MULTISAMPLING

(75) Inventor: Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1117 days.

(21) Appl. No.: 11/833,937

(22) Filed: Aug. 3, 2007

(51) Int. Cl.
*G06T 15/50* (2011.01)
*G09G 5/00* (2006.01)

(52) U.S. Cl. ......... 345/426; 345/611; 345/613; 345/614

(58) Field of Classification Search .................. None
See application file for complete search history.

(56) References Cited

U.S. PATENT DOCUMENTS

| | | | |
|---|---|---|---|
| 6,768,491 B2 * | 7/2004 | Lefebvre et al. | 345/581 |
| 6,781,585 B2 * | 8/2004 | Naegle et al. | 345/501 |
| 6,967,663 B1 * | 11/2005 | Bastos et al. | 345/613 |
| 6,999,100 B1 * | 2/2006 | Leather et al. | 345/611 |
| 7,612,783 B2 * | 11/2009 | Koduri et al. | 345/611 |
| 7,768,524 B2 * | 8/2010 | Snyder et al. | 345/589 |
| 2006/0267991 A1 * | 11/2006 | Preetham et al. | 345/502 |
| 2007/0229503 A1 * | 10/2007 | Witzel et al. | 345/428 |

FOREIGN PATENT DOCUMENTS

WO    WO 2006/056806    *    6/2006

OTHER PUBLICATIONS

Wai-Sum Lin, Rynson W. H. Lau, Kai Hwang, Xiaola Lin, Paul Y. S. Cheung, Adaptive Parallel Rendering on Multiprocessors and Workstation Clusters, IEEE Transactions on Parallel and Distributed Systems, v.12 n.3, p. 241-258, Mar. 2001.*

* cited by examiner

*Primary Examiner* — Daniel Hajnik
(74) *Attorney, Agent, or Firm* — Patterson & Sheridan, LLP

(57) ABSTRACT

One embodiment of the present invention sets forth a technique for improving antialiasing quality, while minimizing performance degradation, by adaptively selecting between multisampling and supersampling on a per pixel basis. The resulting performance may be generally comparable to multisampling. At the same time, however, the resulting quality may be generally comparable to supersampling. The antialiasing technique disclosed herein determines whether to use multisampling or supersampling on a particular pixel being rendered, based on the specific coverage of the associated geometry primitive. Because many pixel centers are covered by a geometry primitive, a statistical performance advantage is gained when pixels in a rendered image can be generating using multisampling rather than supersampling. The cases where pixel centers are not covered tend to be less frequent, but are very significant to image quality. High image quality is maintained by rendering these cases using supersampling.

14 Claims, 10 Drawing Sheets

COVERAGE ADAPTIVE MULTISAMPLING

BACKGROUND OF THE INVENTION

1. Field of the Invention

Embodiments of the present invention relate generally to computer graphics systems and more specifically to coverage adaptive multisampling.

2. Description of the Related Art

Computer graphics systems render images on a two-dimensional grid of pixels that is characterized by a discrete horizontal and vertical quantization resolution. The images may be displayed on a display device or stored for later use. The finite resolution of a rendered image often results in visual artifacts, known generally as "aliasing" artifacts, when the ability of a viewer to resolve spatial resolution exceeds the finite spatial resolution of the rendered image. The visual artifacts associated with aliasing typically appear as jagged edges on object silhouettes or along the intersection of two or more objects. Very small or thin objects may tend to flicker. Another type of aliasing artifact results when the coloration (shading) of pixels varies greatly over a pixel region but the pixel's shading is computed without sufficient sampling over the pixel, typically because the shading is computed at a single location within the pixel. This type of shading aliasing produces noisy or flickering shading results, particularly when animation is involved.

Techniques for reducing the artifacts associated with aliasing are referred to as "antialiasing" techniques. Supersampling and multisampling are two well-known antialiasing techniques. Supersampling increases the spatial rendering resolution of an image by using multiple samples that are fully rendered for every pixel within the final image. For example, a supersampling system may generate a pixel by combining four samples, each typically including independently textured and shaded color, depth and coverage information. The four samples are combined using well-known techniques to produce one pixel in the final image, which benefits in general from the increased inherent spatial rendering resolution provided by the additional samples. Supersampling also reduces both edge and shading artifacts due to aliasing because both coverage and shading are performed at more than one sample per pixel.

When the supersampling system performs texture mapping, each of the four samples within a pixel is usually texture mapped separately according to a specified texture mapping technique. For example, trilinear texture mapping may be used to independently texture each of the four samples, where the center of each sample is used to select a sample location within the associated texture map. The four color values, each generated from eight texels (thirty-two total texels), are combined to generate the color value for the pixel. While supersampling produces very high-quality results, the associated bandwidth and processing load increases in proportion to the number of samples within a pixel, making this technique prohibitively expensive in many scenarios.

Multisampling substantially reduces memory bandwidth and processing load relative to supersampling by eliminating the independent color computation for each sample within a pixel (while preserving the independent computation of depth and coverage for each sample). Instead of texturing and shading each sample color independently, one representative sample point is selected for color shading. The resulting color is applied to all samples within the pixel. The underlying assumption of multisampling is that the color of a given shaded object will not change rapidly within the boundaries of a single pixel and therefore using a single representative color sample for the pixel on the object is adequate. However, since intersecting objects may have very different colors within the area of a single pixel, preserving depth and coverage information is important to accurately represent an intersection of two or more objects within the boundaries of the pixel.

When a multisampling system performs texture mapping, a representative sample point is selected for the purpose of texture mapping the pixel and the resulting texture map color is attributed to all of the samples within the pixel. Well-known techniques exist for selecting the representative sample point, however the process is fundamentally an approximation. For example, basic multisampling selects the pixel center as the representative sample point for shading the entire pixel. When the texture mapped object is relatively large and parallel with the current view plane of a rendered image, the resulting image quality is generally acceptable because variations in the position of the representative sample point have little effect on the location of the sample point within the texture map. However, as the angle of incidence from the view plane to the surface of the texture mapped object increases, small variations in the position of the representative sample point result is large excursions through the texture map image. For example, if the pixel center is used to define the sample point, but the geometric primitive does not actually intersect the pixel center, then the pixel may be shaded with erroneous texture data. In certain scenarios, such as when "atlas" textures (unrelated image panels consolidated into one flat texture map image) are used, striking visual errors may result when an extrapolated sample point from one texture mapped object strays off the atlas panel and into a panel that has no relationship to the texture mapped object.

One well-known technique used to improve image quality of texture mapping in multisampling systems is called "centroid sampling." Centroid sampling, which is a well-known multisampling technique, attempts to guarantee that the representative sample point is located on a covered portion of the texture mapped object by placing the representative sample at the centroid of covered samples. While centroid sampling improves overall image quality in certain basic instances, this technique is still an approximation and does not completely eliminate artifacts in all common scenarios. For example, objects that occupy one or a small number of screen space pixels may not be properly shaded.

In addition, centroid sampling causes texture map address computation resources to generate non-uniformly spaced texture map addresses, rather than evenly spaced texture map addresses that can also be used to compute the partial derivatives needed in level-of-detail (LOD) computations. As a consequence, additional resources are needed to perform LOD computations in a centroid sampling system to avoid artifacts related to erroneous LOD computation.

Another approach to improving the image quality in the presence of multisampling is transparency adaptive multisampling. In essence, this approach resorts to supersampling when semi-transparent (non-fully opaque) objects are rendered. The rationale is that transparent objects are often alpha tested. The alpha color component reflects the degree of opacity. When the opacity is below some threshold, such fragments are discarded. However, if the alpha color component, computed as part of a shading operation, is computed once per pixel and shared with all the samples used for multisampling, then all samples for a given pixel are either discarded or kept as a single group. This leads to jagged edges when semi-transparent objects are rendered. To avoid this problem, transparency adaptive multisampling simply resorts to supersampling instead of multisampling when rendering semi-transparent objects. The overall benefit of transparency adaptive multisampling is therefore limited to improving the rendered quality of transparent objects. However, transparency adaptive multisampling introduces a potential performance inefficiency by unnecessarily supersampling pixels for certain rendered objects that have non-opaque and fully opaque regions, as is often the case for objects like trees and vegetation. Additionally, transparency adaptive multisampling does not improve image quality for non-transparent objects subject to aliasing artifacts due to under-sampled shading. Thus, the applicability of transparency adaptive multisampling is limited because this technique adapts the use of supersampling or multisampling on a coarse basis that is specialized for the specific case of transparent objects.

As the foregoing illustrates, what is needed in the art is an antialiasing technique that provides the high performance and low resource utilization similar to multisampling, while also providing the high image quality that is comparable with supersampling.

SUMMARY OF THE INVENTION

One embodiment of the present invention sets forth a method for rendering an antialiased pixel. The method includes the steps of receiving a pixel fragment that includes coverage information for a pixel, determining whether to shade the pixel using a multisampling technique or a supersampling technique based on the coverage information, and computing the color of the pixel using the multisampling technique or the supersampling technique, as determined, based on shading information included in the pixel fragment.

One advantage of the disclosed method is that by adaptively selecting between multisampling and supersampling based on coverage information, on a per-pixel basis, higher performance and higher image quality may be achieved relative to prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention improves the quality of antialiasing in a graphics rendering engine by adaptively selecting between multisampling and supersampling on a per pixel basis. The resulting performance is very good and is generally comparable to multisampling. At the same time, the resulting quality is very good and is generally comparable to supersampling.

Figure 1:
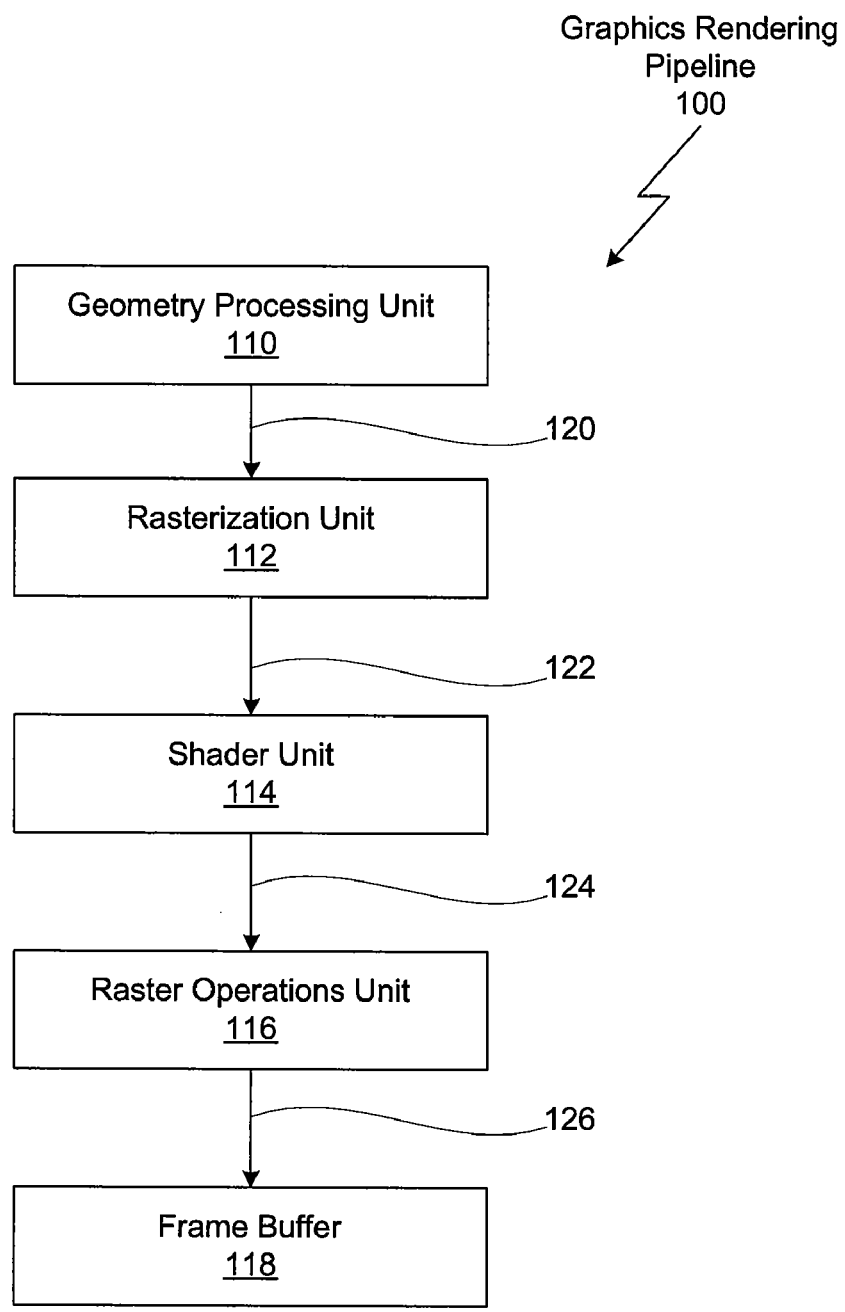
FIG. 1 is a conceptual diagram of a graphics rendering pipeline, according to one embodiment of the invention.

FIG. 1 is a conceptual diagram of a graphics rendering pipeline 100, according to one embodiment of the invention. The graphics rendering pipeline 100 includes, without limitation, a geometric processing unit 110, a rasterization unit 112, a shader unit 114, a raster operations unit 116, and a frame buffer 118.

The geometry processing unit 110 receives geometry objects, typically three-dimensional triangles, from a graphics application (not shown) and conducts geometric transforms as specified by the graphics application. The output of the geometry processing unit 110 includes geometric primitives 120, such as triangles, that are transformed and projected onto a two-dimensional surface, referred to as "screen space." Screen space may correspond to a region on a viewer's display screen used to display rendered images. Alternately, a two-dimensional surface in screen space may correspond to a destination rendering surface in applications that do not immediately display rendered frame buffer data to a screen. Such applications may render, for example, to a video clip that is stored before being viewed.

The geometric primitives 120 are distributed to one or more rasterization units 112. The rasterization unit 112 converts the geometric primitives 120 into fragments 122, corresponding to screen space pixels that are least partially covered by the geometric primitives. In decomposing geometric primitives 120 into fragments 122, the rasterization unit 112 determines the screen space pixel coverage of each geometric primitive along with the sample coverage of each fragment. Additionally, the rasterization unit 112 determines the screen space coverage and alignment of each geometric primitive 120. The rasterization unit 112 generates output data that includes, without limitation, fragments 122 that include geometric coverage and depth information.

The shader unit 114 receives fragments from the rasterization unit 112 and processes the fragments into shaded pixels 124, according to shading instructions specified by the graphics application. The shaded pixels 124 are transmitted to the raster operations unit 116 for further processing. The raster operations unit 116 performs any needed blending on the shaded pixels or samples, as specified by the graphics application, and generates pixel data 126 that is transmitted to the frame buffer 118 for storage and display.

The frame buffer 118 includes, without limitation, buffers for depth information and buffers for color information. The frame buffer 118 is typically structured as a two-dimensional surface mapped into linear memory space.

Persons skilled in the art will recognize that the present invention is not limited in any way by the architecture of FIG. 1. In particular, the teachings of the present invention are equally applicable in graphics rendering pipelines having one or more geometry processing units, one or more rasterization units, one or more shaders, one or more raster operations units and one or more frame buffers. For this reason, the remainder of the description may include references to particular elements of the graphics rendering pipeline in either singular or plural form without any intention to limit the scope of the present invention.

Figure 2:
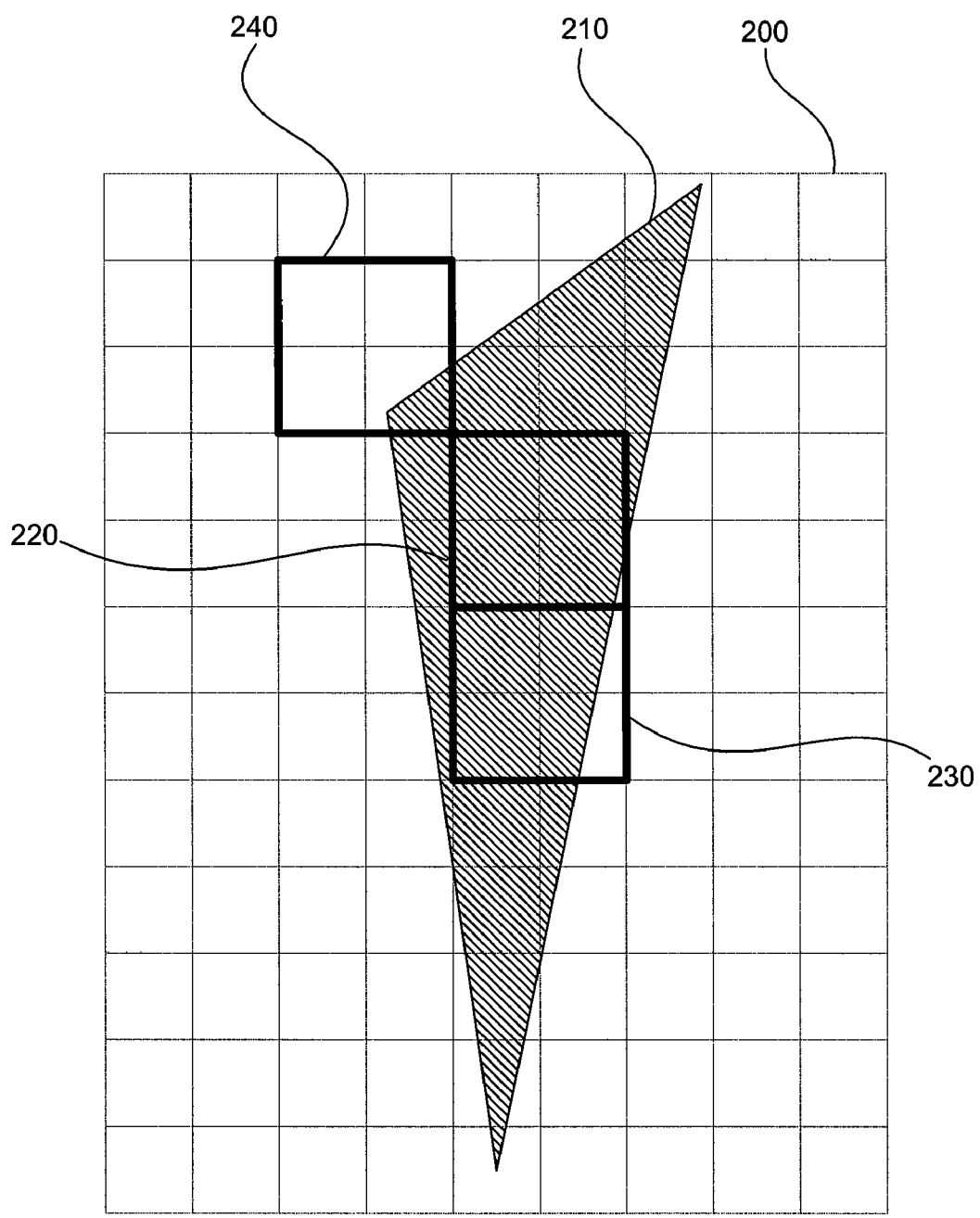
FIG. 2 illustrates geometric primitive coverage of pixel quads, according to one embodiment of the invention.

FIG. 2 illustrates geometric primitive coverage of pixel quads, according to one embodiment of the invention. A geometric primitive 210, in this case a triangle, is projected onto a two-dimensional grid of pixels 200. A given pixel may be fully covered, partially covered, or not covered at all by the geometric primitive 210. Pixels that are not covered at all typically do not require further processing. Pixels that are fully covered or partially covered are processed further according to certain discard techniques (such as depth sorting and stencil testing) and shading techniques (such as texture mapping). Pixel coverage may be determined according to well-known techniques. One such technique divides the area of a pixel into regions, each with an associated sample point. If the geometric primitive 210 covers a sample point, that region is deemed to be "covered." For example, the pixel may include five sample points. A first sample point may be situated in the center of the pixel. The remaining four sample points may be distributed about the pixel center in a specific pattern.

Certain graphics rendering pipelines increase overall throughput by processing two or more pixels in parallel. For example, the graphics rendering pipeline 100 may process four pixels in parallel, where the four pixels are organized as a two-by-two pixel area called a "pixel quad." Pixel quads 220, 230 and 240 depict three different coverage scenarios, illustrated in greater detail in FIGS. 3A, 3B, and 3C, respectively.

Figure 3A:
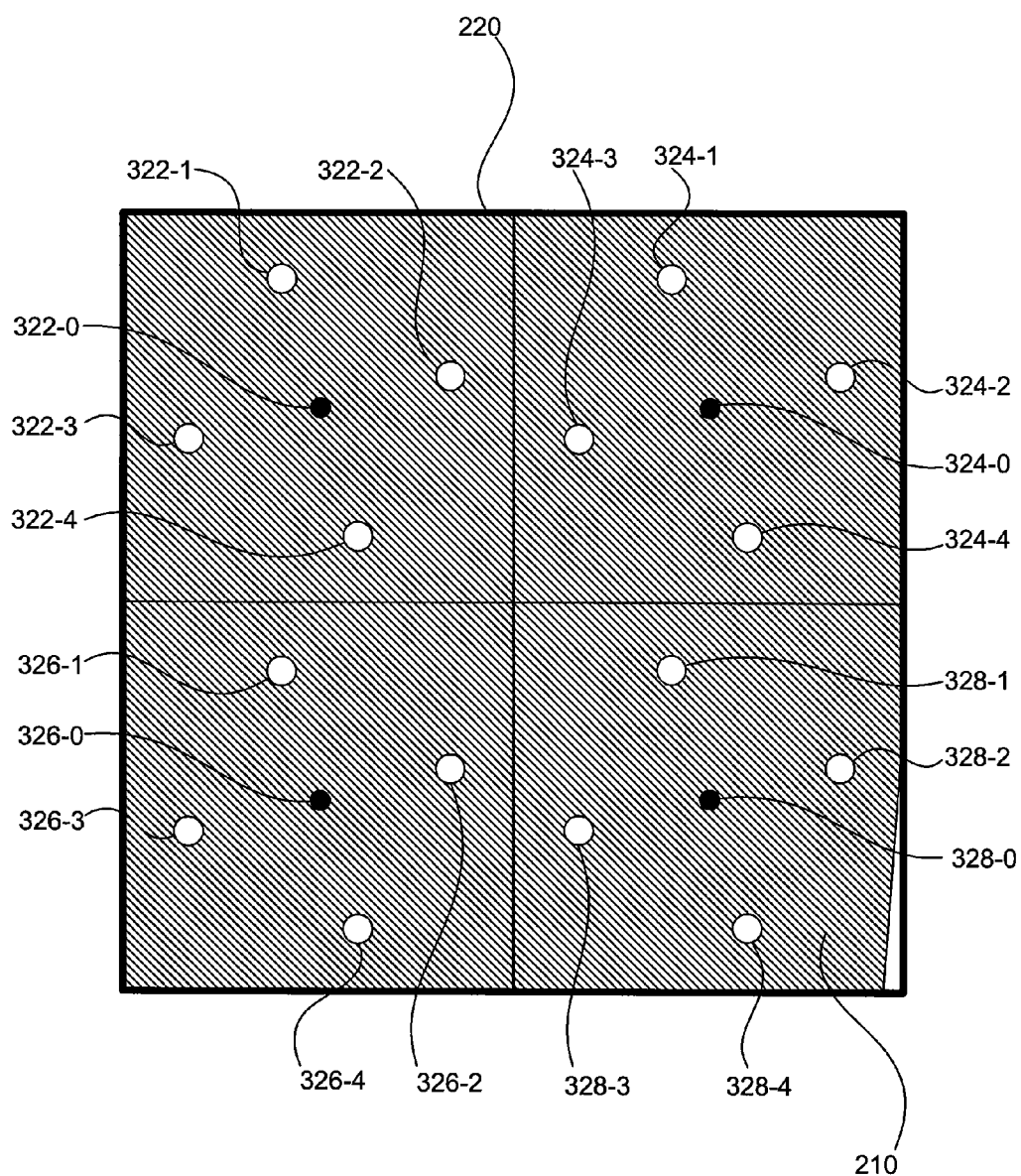
FIGS. 3A-3F illustrate various exemplary coverage scenarios where coverage adaptive multisampling can be used to compute the colors of the different pixels in a pixel quad.

FIG. 3A illustrates geometric primitive coverage of a pixel quad 220 for the case where the samples of every pixel are fully covered by the geometric primitive 210. As shown, the four pixels in the pixel quad 220 are considered to be fully covered because all samples 322, 324, 326 and 328 within the associated pixels are covered by geometric primitive 210. In this scenario, multisampling may be used to compute the color of each pixel in the pixel quad. That is, the color of each pixel in the pixel quad may be computed using center samples 322-0, 324-0, 326-0 and 328-0.

Figure 3B:
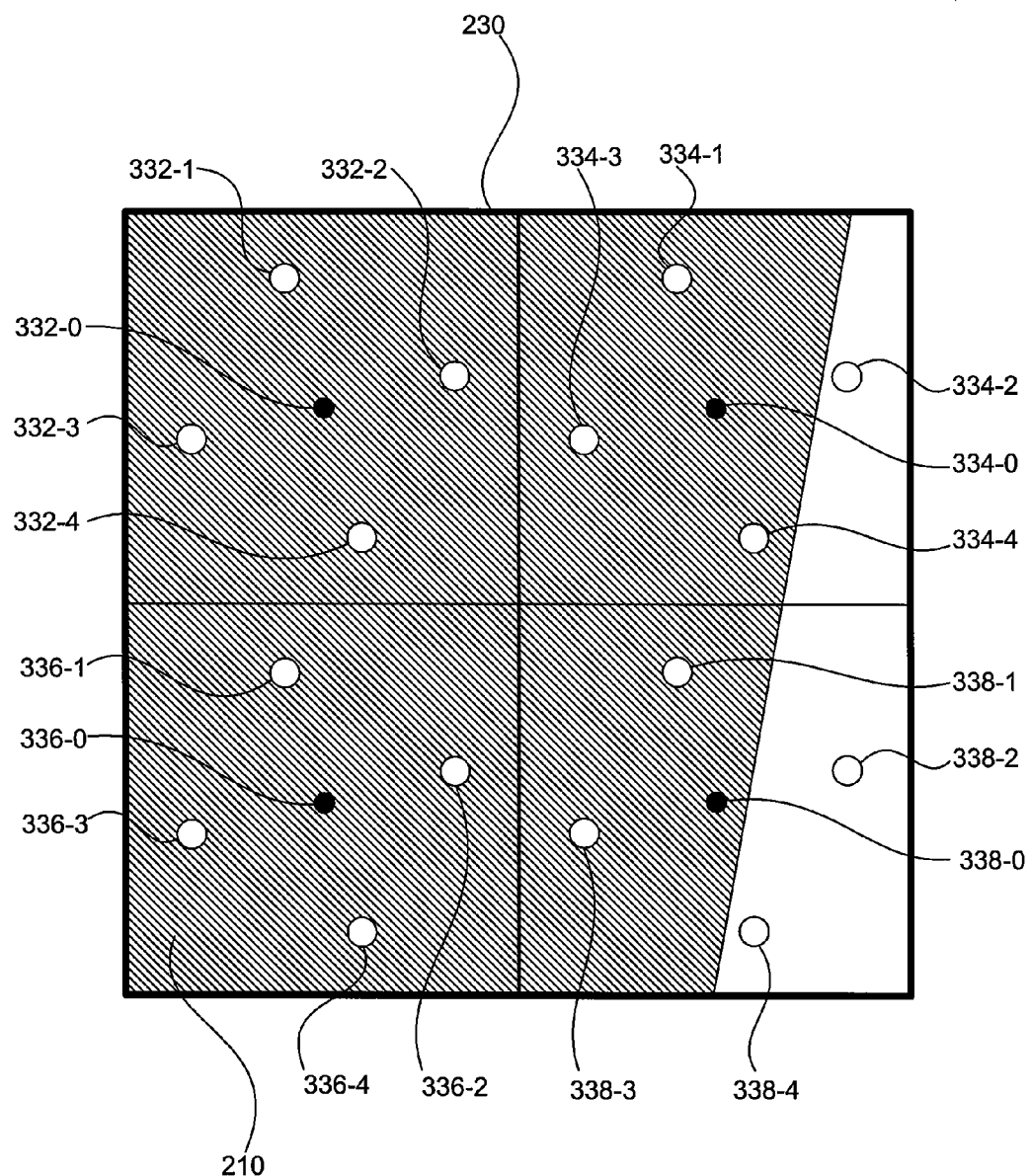

FIG. 3B illustrates geometric primitive coverage of a pixel quad 230 for the case where samples 334 and 338 are not fully covered by the geometric primitive 210, but the center samples 332-0, 334-0, 336-0 and 338-0 of the four different pixels are all covered. In this scenario, multisampling may again be used to compute the color of each pixel in the pixel quad using center samples 332-0, 334-0, 336-0 and 338-0.

Figure 3C:
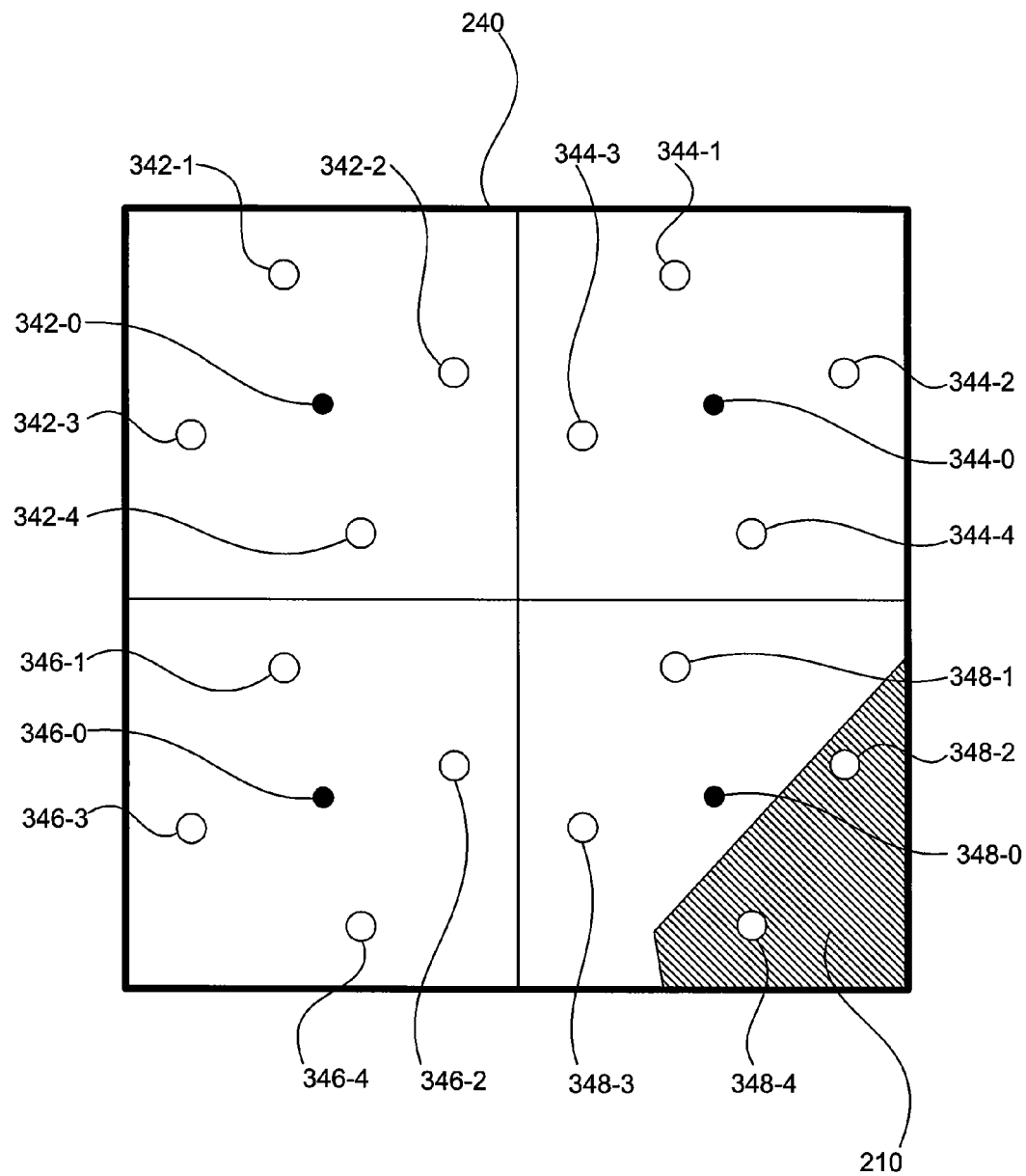

FIG. 3C illustrates geometric primitive coverage of a pixel quad 240 for the case where certain samples are covered by the geometric primitive 210, but none of the center samples 342-0, 344-0, 346-0, 348-0 is covered. As shown, only samples 348-2 and 348-4 are covered. In this scenario, supersampling with samples 348-2 and 248-4 may be used to compute the color of the partially covered pixel. The other pixels of the pixel quad 240 do not need further processing since they are not covered by the geometric primitive 210.

Figure 3D:
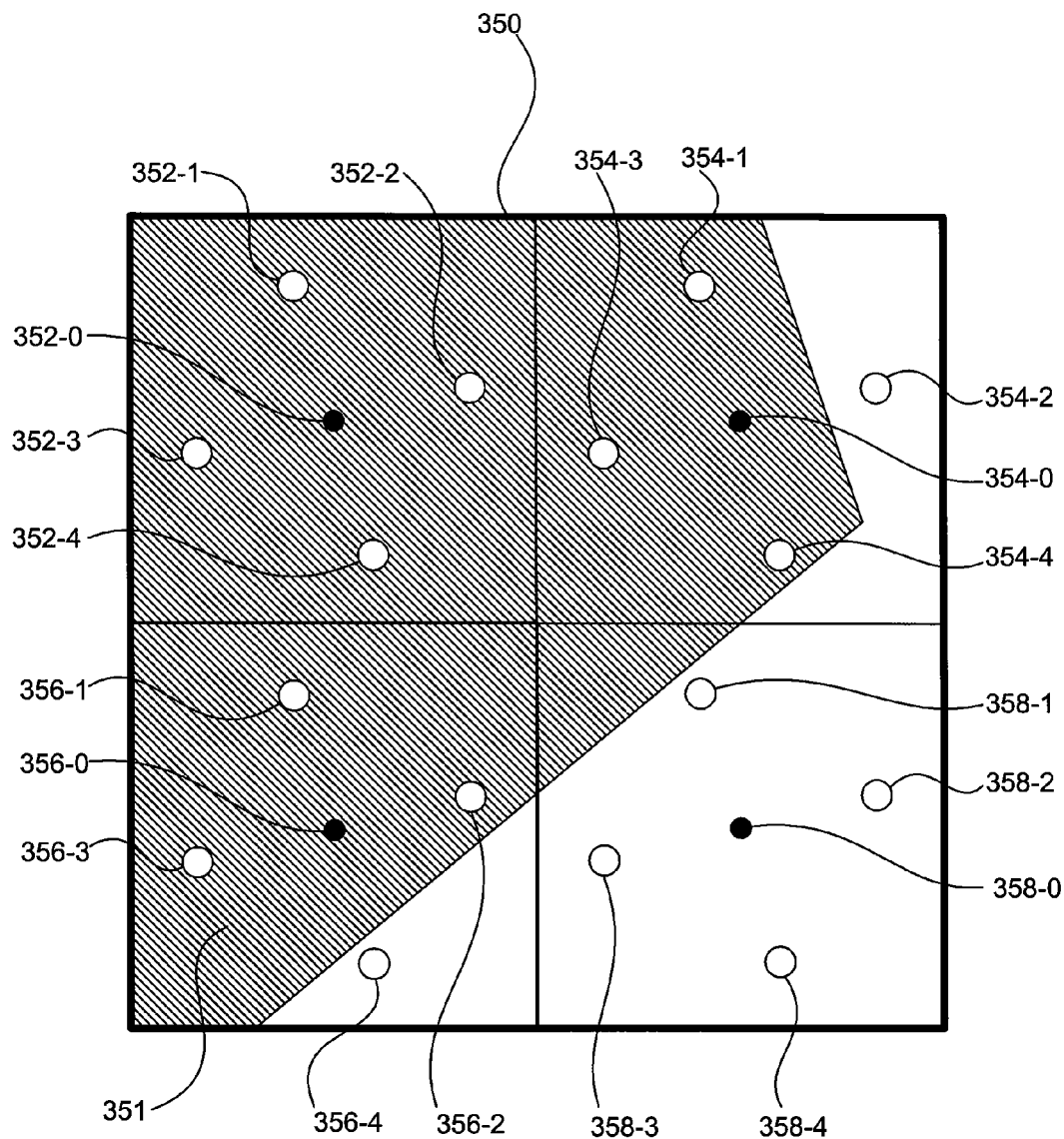
Figure 3E:
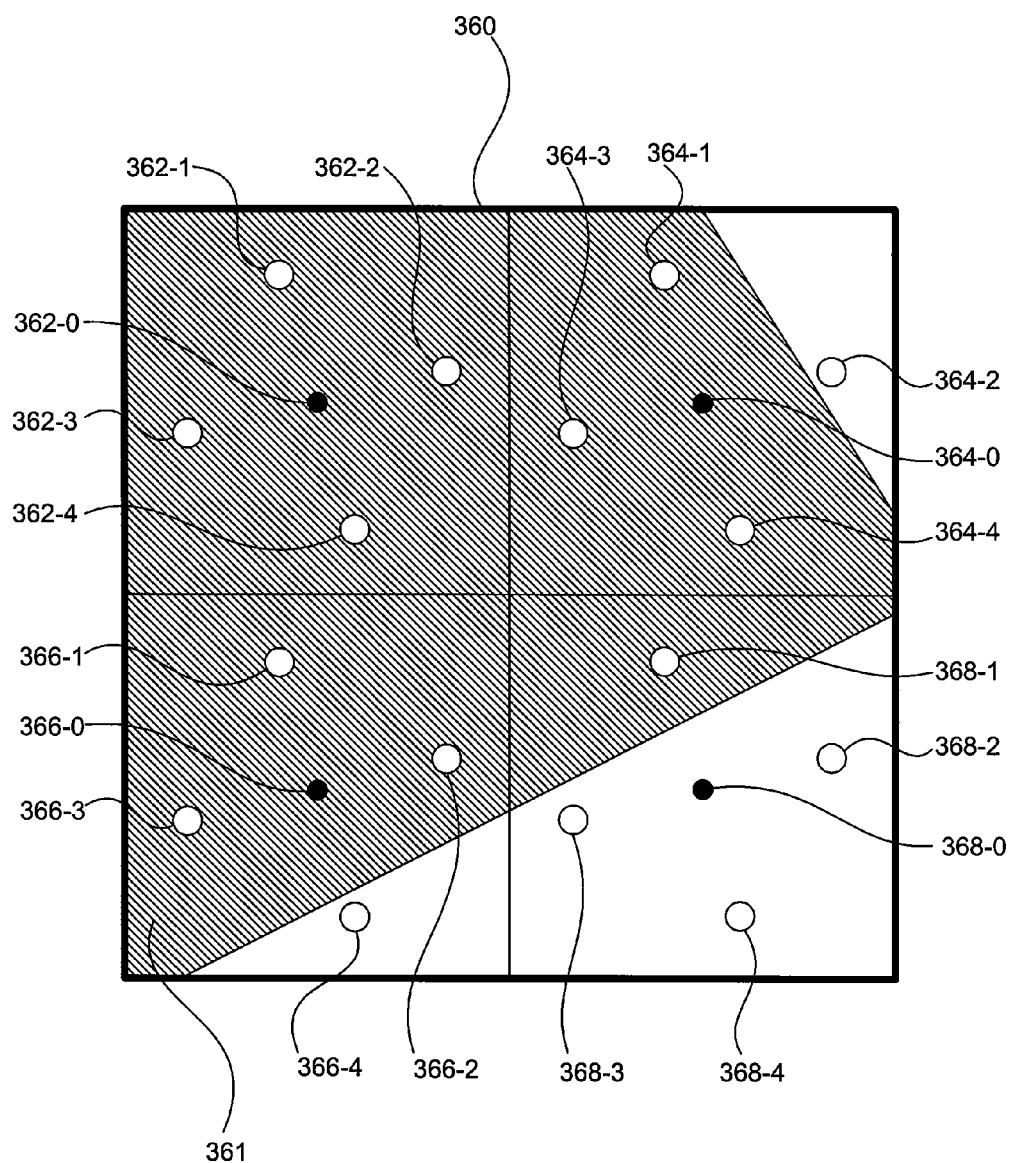
Figure 3F:
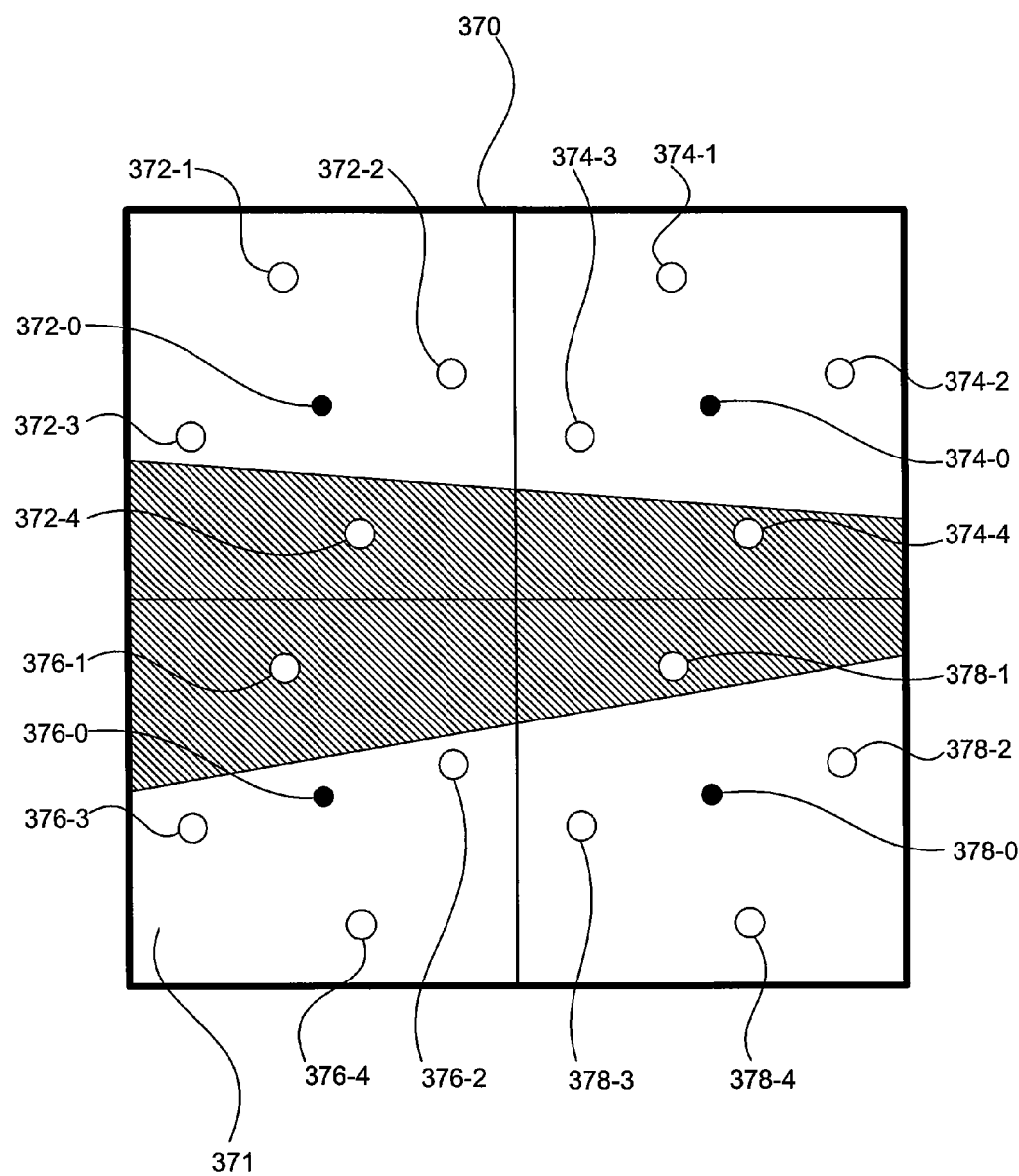

FIGS. 3A-3C illustrate three different scenarios of pixel coverage within a pixel quad, as depicted in FIG. 2. FIGS. 3D-3F illustrate other exemplary pixel coverage scenarios that may exist within a pixel quad.

FIG. 3D illustrates geometric primitive coverage of a pixel quad 350 for the case where three center samples 352-0, 354-0 and 356-0 are covered by a geometric primitive 351, but none of the samples 358 is covered. In this scenario, multisampling may be used to compute the color of each of the three covered pixels in the pixel quad 350 using center samples 352-0, 354-0 and 356-0. Since none of the samples 358 is covered, the associated pixel requires no further processing.

FIG. 3E illustrates geometric primitive coverage of a pixel quad 360 for the case where three center samples 362-0, 364-0 and 366-0 are covered by a geometric primitive 361, center sample 368-0 is not covered, but sample 368-1 is covered. In this scenario, a hybrid of multisampling and supersampling may be used to compute the colors of the pixels in the pixel quad 360. Multisampling may be used to compute the color of each of the three covered pixels in the pixel quad 360 using center samples 362-0, 364-0 and 366-0. Supersampling using sample 368-1 may be used to compute the color of the one pixel not having a covered pixel center.

FIG. 3F illustrates geometric primitive coverage of a pixel quad 370 for the case where all pixels are partially covered by a geometric primitive 371, but no center sample is covered. Since none of the center samples 372-0, 374-0, 376-0 and 378-0 is covered by the geometric primitive 371, multisampling is not used. Rather, pure supersampling using samples 372-4, 374-4, 376-1 and 378-1 may be used to compute the colors of the respective pixels in the pixel quad 370.

FIGS. 3A-3F conceptually illustrate how coverage adaptive multisampling can be used to compute the colors of the pixels in a pixel quad. As described below in FIG. 4, the decision of whether to use multisampling (based, for example, on one covered center sample) or supersampling (based on a set of covered distributed samples) to compute the color for a particular pixel is based on the coverage of a geometric primitive relative to the individual pixel.

Figure 4:
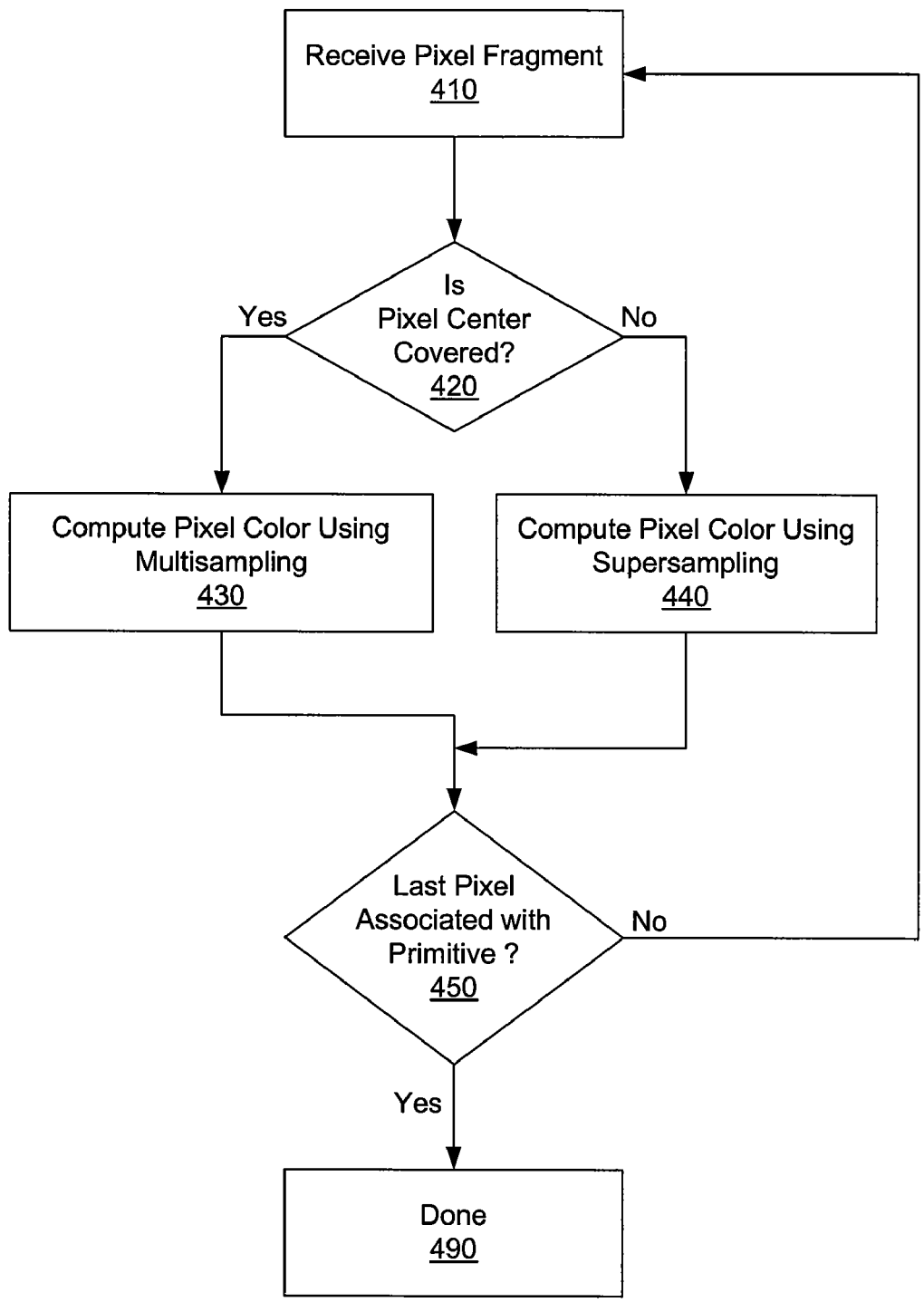
FIG. 4 is a flow diagram of method steps for adaptively determining the antialiasing mode of a pixel, according to one embodiment of the invention.

FIG. 4 is a flow diagram of method steps for adaptively determining the antialiasing mode of a pixel, according to one embodiment of the invention. Although the method steps are described in conjunction with the systems of FIGS. 1 and 5, persons skilled in the art will understand that any system that performs the method steps, in any order, is within the scope of the invention.

The method begins in step 410, where the shader unit 114 receives a pixel fragment for processing a pixel. As is well-known, the pixel fragment includes information such as the coverage information for the pixel as well as shading information. In step 420, the shader unit 114 examines the center sample of the pixel for coverage. If the center sample is covered, then the method proceeds to step 430, where the shader unit 114 computes the pixel color using a multisampling technique. The method proceeds to step 450. In step 450, the shader unit 114 determines whether the last pixel associated with current primitive has been processed. If all pixels have been processed, then the method terminates in step 490. If all pixels have not yet been processed, then the method returns to step 410.

Returning now to step 420, if the shader unit 114 determines that the center sample is not covered, then the method proceeds to step 440, where the shader unit 114 computes the pixel color using a supersampling technique. The method then proceeds to step 450, as described above.

Figure 5:
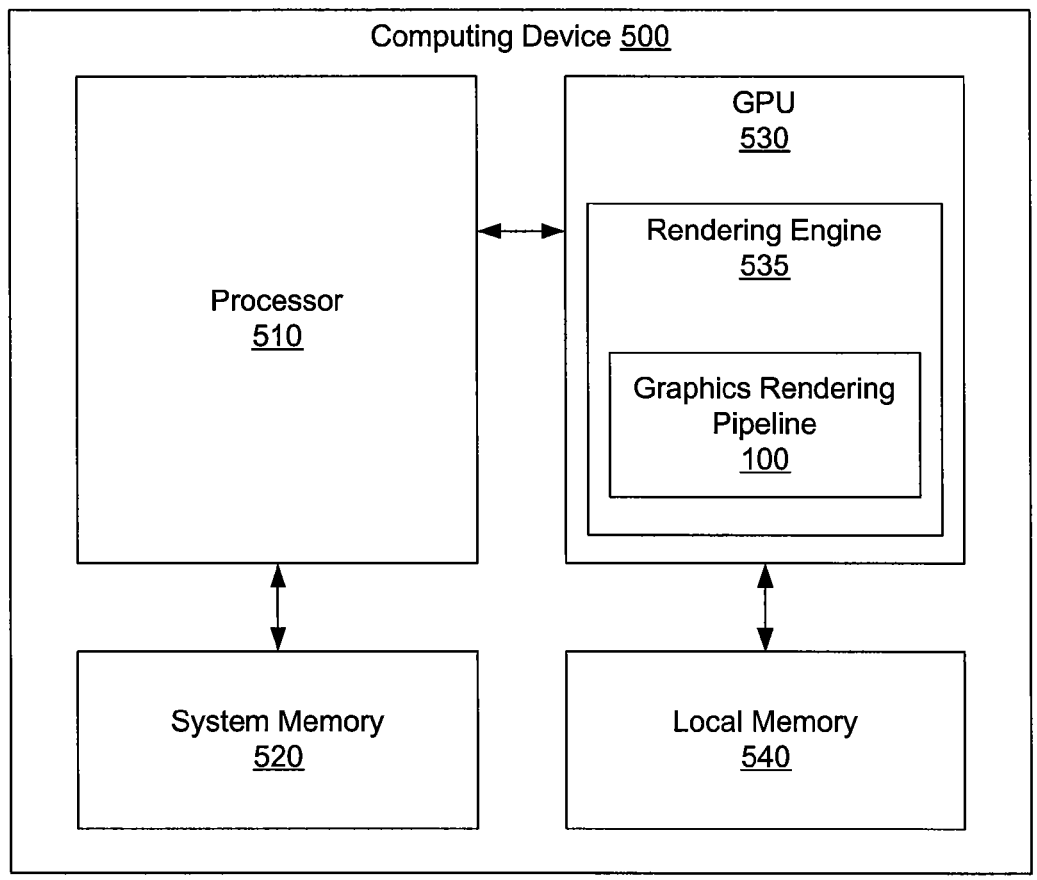
FIG. 5 is a conceptual diagram of a computing device configured to implement one or more aspects of the present invention.

FIG. 5 is a conceptual diagram of a computing device 500 configured to implement one or more aspects of the present invention. The computing device 500 includes, without limitation, a processor 510, system memory 520, a graphics processing unit (GPU) 530 and local memory 540 coupled to the GPU 530. The GPU 530 includes at least one rendering engine 535 that, in turn, includes at least one graphics rendering pipeline 100 used to process data, as described above. In alternate embodiments, the processor 510, GPU 530, local memory 540, system memory 520, or any combination thereof, may be integrated into a single processing unit. Furthermore, the functionality of GPU 530 may be included in a chipset or in some other type of special purpose processing unit or co-processor. Persons skilled in the art will recognize that any system having one or more processing units configured to implement the teachings disclosed herein falls within the scope of the present invention. Thus, the architecture of computing device 500 in no way limits the scope of the present invention.

In sum, the coverage of a geometric primitive on a pixel being rendered determines which of two antialiasing strategies are used to compute the final color of the pixel. If the pixel center is covered, then the pixel color is computed according to the color of the pixel center. However, if the pixel center is not covered, then supersampling is used to compute the color of the pixel. By adaptively selecting between multisampling and supersampling, on a per-pixel basis, higher performance and higher image quality may be achieved overall.

While the determination of whether to use multisampling or supersampling described above is based on whether or not the pixel center is covered, other criteria based on the coverage can be considered as well. For example, the decision could be based on the percentage of samples covered compared to a fixed or programmable threshold. Additionally, the determination could be influenced by other modes within the graphics pipeline, such as whether alpha testing (typically enabled in conjunction with semi-transparent objects) is enabled. The determination may also control the number of samples shaded for the pixel.

Embodiments of the present invention may be implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention.

While the forgoing is directed to embodiments of the present invention, other and further embodiments of the invention may be devised without departing from the basic scope thereof. For example, much of the above description references "multisampling" and "supersampling" techniques. Persons skilled in the art will understand that the teachings of the present invention extend to any such techniques, including, without limitation, centroid sampling and center sampling. The scope of the present invention is therefore determined by the claims that follow.

I claim:

1. A method for adaptively rendering antialiased pixels, the method comprising:
receiving a geometric primitive;
decomposing the geometric primitive into pixel fragments corresponding to pixels that are at least partially covered by the geometric primitive;
determining coverage information of the geometric primitive indicating geometric coverage for the pixels that are at least partially covered by the pixel fragments, wherein each pixel includes a center sample;
adaptively determining, for each one of the pixel fragments, within a shading unit of a graphics rendering pipeline, whether to shade each said pixel via a multisampling technique or a supersampling technique based on the coverage information,
wherein each said pixel is shaded using the multisampling technique if the coverage information indicates that the center sample is covered and,
wherein the pixel includes a center sample and a first additional sample, and the pixel is shaded using the supersampling technique if the coverage information indicates that the center sample is not covered but at least the first additional sample is covered; and
computing the color of the pixel using the multisampling technique or the supersampling technique, as determined, based on shading information included in the pixel fragment.

2. The method of claim 1, wherein the multisampling technique comprises centroid sampling or center sampling.

3. The method of claim 1, wherein the pixel includes a second additional sample, and the coverage information indicates that the second additional sample also is covered when the coverage information indicates that the center sample is not covered.

4. The method of claim 1, wherein the pixel includes a four additional samples evenly distributed within the pixel about the center sample.

5. The method of claim 1, wherein the steps of receiving, determining and computing are performed in parallel for each pixel in a pixel quad.

6. A non-transitory computer-readable medium that includes instructions that when executed by a processor cause the processor to adaptively render antialiased pixels by performing the steps of:
receiving a geometric primitive;
decomposing the geometric primitive into pixel fragments corresponding to pixels that are at least partially covered by the geometric primitive;
determining coverage information of the geometric primitive indicating geometric coverage for the pixels that are at least partially covered by the pixel fragments, wherein each pixel includes a center sample;
adaptively determining, for each one of the pixel fragments, within a shading unit of a graphics rendering pipeline, whether to shade each said pixel via a multisampling technique or a supersampling technique based on the coverage information,
wherein each said pixel is shaded using the multisampling technique if the coverage information indicates that the center sample is covered and,
wherein the pixel includes a center sample and a first additional sample, and the pixel is shaded using the supersampling technique if the coverage information indicates that the center sample is not covered but at least the first additional sample is covered; and
computing the color of the pixel using the multisampling technique or the supersampling technique, as determined, based on shading information included in the pixel fragment.

7. The computer-readable medium of claim 6, wherein the multisampling technique comprises centroid sampling or center sampling.

8. The computer-readable medium of claim 6, wherein the pixel includes a second additional sample, and the coverage information indicates that the second additional sample also is covered when the coverage information indicates that the center sample is not covered.

9. The computer-readable medium of claim 6, wherein the pixel includes four additional samples evenly distributed within the pixel about the center sample.

10. The computer-readable medium of claim 6, wherein the steps of receiving, determining and computing are performed in parallel for each pixel in a pixel quad.

11. A computing device configured to adaptively render antialiased graphics images, the computer system comprising:
a memory; and a processing unit that includes a graphics rendering pipeline that includes:

a geometry processing unit configured to receive a geometric object and to transform the geometric object into a geometry primitive, a rasterization unit configured to receive a geometry primitive from the setup engine and convert the geometry primitive into one or more pixel fragments and determine coverage information of the geometric primitive indicating geometric coverage for the pixels that are at least partially covered by the one or more pixel fragments, wherein each pixel includes a center sample, a shader unit configured to perform shading operations generate a shaded pixel by:

receiving the one or more pixel fragments and coverage information, adaptively determining, for each one of the pixel fragments, within a shading unit of a graphics rendering pipeline, whether to shade each said pixel via a multisampling technique or a supersampling technique based on the coverage information, wherein each said pixel is shaded using the multisampling technique if the coverage information indicates that the center sample is covered and, wherein the pixel includes a center sample and a first additional sample, and the pixel is shaded using the supersamplinq technique if the coverage information indicates that the center sample is not covered but at least the first additional sample is covered, and computing the pixel color using the multisampling technique or the supersampling technique, as determined, based on shading information included in the pixel fragment, a raster operations unit configured to perform discard and update operations associated with the shaded pixel, and a frame buffer configured to store the shaded pixel.

12. The computing device of claim 3, wherein the multisampling technique comprises centroid sampling or center sampling.

13. The computing device of claim 11, wherein the pixel includes a four additional samples evenly distributed within the pixel about the center sample.

14. The computing device of claim 11, wherein the shader unit is configured to perform the steps of receiving, determining and computing in parallel for each pixel in a pixel quad.

* * * * *